United States Patent [19]

Smith

[11] 4,112,183
[45] Sep. 5, 1978

[54] FLEXIBLE RESIN RICH EPOXIDE-MICA WINDING TAPE INSULATION CONTAINING ORGANO-TIN CATALYSTS

[75] Inventor: James D.B. Smith, Wilkins Township, Allegheny County, Pa.

[73] Assignee: Westinghouse Electric Corp., Pittsburgh, Pa.

[21] Appl. No.: 782,696

[22] Filed: Mar. 30, 1977

[51] Int. Cl.$^2$ .................. H02K 1/04; H02K 3/30; B32B 27/38; B32B 19/00

[52] U.S. Cl. .................. 428/363; 310/208; 427/104; 427/116; 427/386; 428/377; 428/414; 428/454

[58] Field of Search ............... 428/363, 454, 377, 413, 428/414; 427/58, 104, 116, 179, 386; 310/208

[56] References Cited

U.S. PATENT DOCUMENTS

| | | | |
|---|---|---|---|
| 2,757,298 | 7/1956 | Botts et al. | 310/208 |
| 3,226,286 | 12/1965 | Scheuer | 428/363 |
| 3,355,310 | 11/1967 | Jean et al. | 427/104 |
| 3,983,289 | 9/1976 | Nishizaki et al. | 428/268 |
| 3,998,983 | 12/1976 | Smith | 428/363 |
| 4,013,987 | 3/1977 | Foster | 428/363 |
| 4,020,017 | 4/1977 | Smith et al. | 428/413 X |

*Primary Examiner*—Harold Ansher
*Attorney, Agent, or Firm*—D. P. Cillo

[57] ABSTRACT

A highly flexible mica winding tape is made by: (A) mixing epoxide resin with solvent, (B) adding from 0.01 to 5.0 parts per 100 parts epoxide resin of an organo-tin compound, and mixing to form a homogeneous admixture, (C) applying the admixture to a flexible sheet material comprising mica, so that the organo-tin compound contacts the mica, causing the organo-tin compound to act as a latent catalyst, and (D) removing solvent, to form a flexible sheet with substantially unreacted epoxide resin containing an amount of substantially unreacted organo-tin catalyst effective to advance the epoxide in the sheet material from the substantially unreacted state to a cured thermoset state upon heating over a resin-catalyst temperature of 120° C.

17 Claims, 4 Drawing Figures

FLEXIBLE RESIN RICH EPOXIDE-MICA WINDING TAPE INSULATION CONTAINING ORGANO-TIN CATALYSTS

BACKGROUND OF THE INVENTION

In the manufacture of large rotating machines, epoxide resins have long been used as vacuum impregnants for insulation which relies upon mica, in the form of paper, flakes or large splittings as the dielectric. In this art, vinyl modified epoxide-acid anhydride impregnating systems are generally catalyzed with materials such as dicumyl peroxide and tertiary butylperbenzoate, as shown by Mertens, in U.S. Pat. No. 3,647,611, or with quaternary organic phosphonium compounds, as shown by Rogers, in U.S. Pat. No. 3,759,866.

Puchalla, in U.S. Pat. No. 3,244,670, catalyzed epoxides of cyclohexane derivatives with a wide variety of organo-tin halides, used as accelerators, generally in combination with an acid anhydride or phenolic type curing agent. In a somewhat similar fashion, Markovitz, in U.S. Pat. No. 3,622,524, reacted 20 to 80 wt.% of an organo-tin compound, preferably an oxide, with an organic acid or acid anhydride, as a cross-linking agent for epoxide impregnating resins.

Smith et al., in U.S. Pat. No. 4,020,017, eliminated the need for acid anhydride curing or cross-linking agents, in cycloaliphatic or glycidyl ester epoxide systems. Smith used a stablizing, reactive, low viscosity epoxide dilutent, such as neopentyl diglycidyl ether, in conjunction with selected organo-tin halides, to provide low viscosity vacuum impregnating resins for flexible mica insulation used in high voltage stress applications. The Smith resins provided latent catalytic characteristics due to the formation of inner oxonium salts between the organo-tin compound and the diluent.

Vacuum impregnation is costly and time consuming, but has generally been considered necessary to get a void free insulating tape. Groff, however, in U.S. Pat. No. 3,660,220, used a mica-glass cloth tape, impregnated with a solution of an epoxide-caster oil modified acid anhydride, as a flexible pre-preg electrical insulation for motors. The solutions were catalyzed with stannous octoate, tertiary amines or boron trifluoride complexes. These catalysts, however, provide poor electrical dissipation (power) factor values of 25% at 155° C. Also, these mica tapes would not retain their initial flexibility after prolonged storage.

Nishizaki, in U.S. Pat. No. 3,983,289, attempted to solve epoxide pre-preg storage problems. Nishizaki provided arc and track resistant pre-pregs, containing liquid alicyclic epoxy compounds and up to 20 parts per 100 parts epoxy of a wide variety of latent curing agents. The curing agents included salts of Lewis bases, such as triethylammonium acetate; Lewis acids such as boron trifluoride; amines, such as monoethyl amine; phosphines, such as triphenyl phosphine; urea compounds; and long hydrocarbon chain carboxylic acid organo-tin compounds, such as dibutyl tin maleate, dibutyl tin dilaurate and dimethyl tin dioctoate. An epoxy-curing agent solution, after application to a wide variety of solid substrates, such as cloth, paper, asbestos, fiberglass, fibrous sulfates or aluminates, woven plastics and mica paper, among others, was heated between 90° to 140° C to remove solvent. This heating step partly reacts the epoxy and curing agent to form a rigid, B staged resin. This rigid pre-preg is used in board, rod or tube form. They can be used to cover already wound coil insulating tapes or as insertions between foil conductors. They have particular application as arc and track resistant support rods and slot wedges.

While the pre-preg concept is an improvement in the art, it presents a host of problems with respect to tensile strength, void-free resin impregnation, retention of flexibility during solvent removal, and continued flexibility after long periods of storage, i.e. over 6 months. What is needed is a flexible mica-latent catalyzed, resinous insulation winding tape for high voltage motors and large rotating machines, that is void-free, that remains flexible after solvent flash-off, that will retain flexibility after long-term storage, and has sufficient strength and flexibility to be wound onto motor and generator coils.

SUMMARY OF THE INVENTION

Briefly, the above problems are solved by contacting flexible sheet insulation, generally in the form of a tape containing mica, with a homogeneous, polymerizable, resinous admixture containing epoxide resin, solvent for the epoxide resin, and an organo-tin compound. After applying the admixture to the flexible mica sheet, the organo-tin compound contacts the mica, causing the organo-tin to act as an extremely stable latent catalyst. The solvent in the composition is then removed, generally evaporated at a temperature and for a time effective to remove about 95 to about 99% of the solvent initially present in the tape, without any substantial curing of the epoxide or reaction of the latent catalyst. This solvent removal provides a non-tacky, highly flexible, substantially unreacted epoxide resin, containing a higher concentration of the substantially unreacted organo-tin compound. During solvent removal additional organo-tin compound contacts the mica in the sheet material, causing more organo-tin compound to act as a latent catalyst.

The organo-tin compounds in contact with mica are believed to form charge transfer complexes at the basic sites on the mica surface providing an extrememly stable latent catalytic effect allowing complete solvent removal without any appreciable epoxide or organo-tin reaction. This in turn allows use of semi-solid epoxide resins and single solvent systems without forming tacky, stiff tape insulation. They also allow elimination of stablizing, reactive epoxide diluents which can cause excessive tackiness in pre-impregnated winding tapes. The method of this invention provides high voltage capability mica insulation that is resin saturated, extremely flexible, and tack-free at 25° C for over 6 months. The compositions will allow complete solvent flash off without any substantial resin cure; and upon complete cure at a resin-catalyst temperature of over about 120° C, the epoxide will react with the organo-tin latent catalyst to form a thermoset resin. the mica insulation will generally provide power factor values of below 15% at 150° C. The impregnated, flexible, mica insulation possesses good solvent and chemical resistance properties, and excellent tensile strength, allowing it to be used on commerical coil taping machines.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
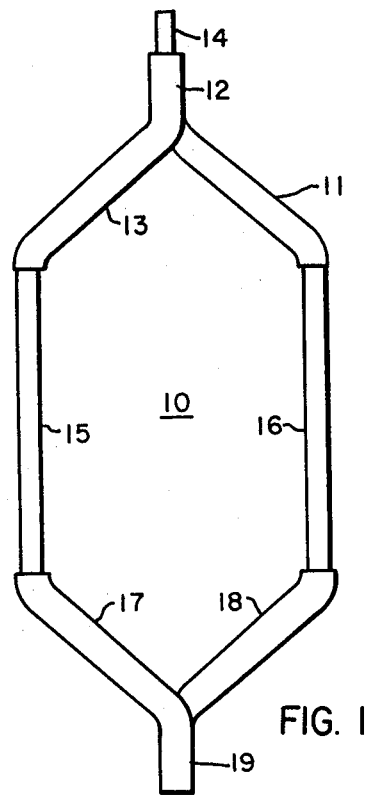
FIG. 1 is a plan view of a closed electrical coil member having two slot portions.

One type of epoxide or epoxy resin, which may be used in the invention, is obtainable by reacting epichlorohydrin with a dihydric phenol in an alkaline medium at about 50° C, using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the chemical structural formula:

where $n$ is an integer of the series 0, 1, 2, 3 ..., and R represents the divalent hydrocarbon radical of the dihydric phenol. Typically R is:

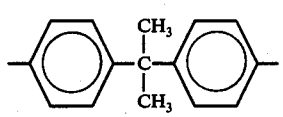

to provide a diglycidyl ether of bisphenol A type epoxide or

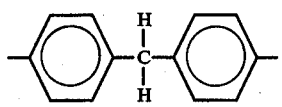

to provide a diglycidyl ether of bisphenol F type epoxide resin.

The bisphenol epoxides used in the invention have a 1, 2 epoxy equivalency greater than one. They will generally be diepoxides. By the epoxy equivalency, reference is made to the average number of 1, 2 epoxy groups,

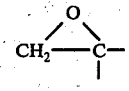

contained in the average molecule of the glycidylether. Typically, epoxy resins of bisphenol are readily available in commerical quantities and reference may be made to *The Handbook of Epoxy Resins*, by Lee and Neville for a complete description of their synthesis.

Other glycidylether resins that are useful in this invention include polyglycidylethers of a novolac. The polyglycidylethers of a novolac suitable for use in accordance with this invention are prepared by reacting an epihalohydrin with phenol formaldehyde condensates, While the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins.

The product of the reaction is generally a massive oxidation resistant aromatic compound, one example of which is represented by the chemical structural formula:

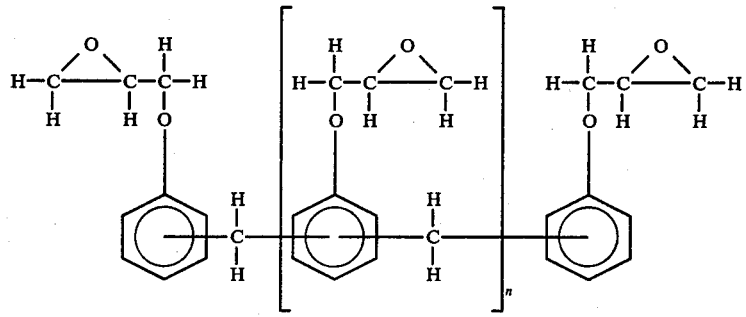
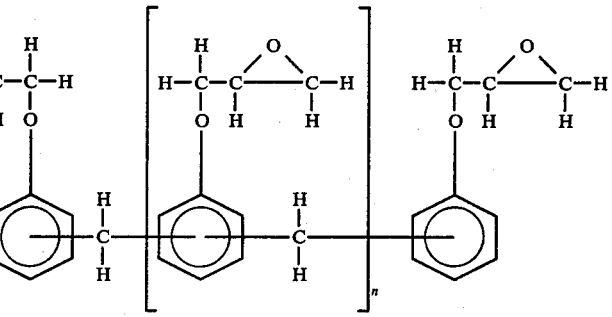

wherein $n$ is an integer of from 0 to 6.

Although epoxy novolac resins from formaldehyde are generally preferred for use in this invention, epoxy novolac resins from any other aldehyde such as, for example, acetaldehyde, chloraldehyde, butylaldehyde, fufuraldehyde, can also be used. Although the above formula shows a completely epoxidized novolac, other epoxy novolacs which are only partially epoxidized can be useful in this invention. An example of a suitable epoxy novolac is 2, 2, bis [p-(2,3-epoxypropoxy)-phenyl]-methane. These resins are well known in the art and reference may be made to *The Handbook of Epoxy Resins* for a complete description of their synthesis.

Multi-functional epoxy resins are also useful epoxy resins in this invention. These resins are somewhat similar to epoxy novolacs, and can be mixtures of epoxy novolacs with bisphenol A or bisphenol F epoxides. These resins generally have extremely high temperature resistance and are commercially available as polyfunctional epoxy resins. One particularly useful resin of this type is based on triphenol methane, and has the chemical structure:

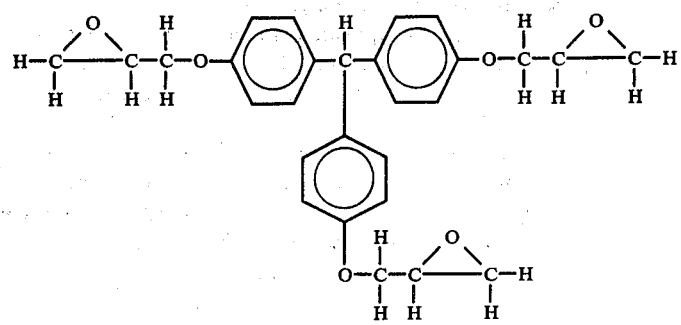

Other useful epoxy resins include glycidyl esters, hydantoin epoxy resins and cycloaliphatic epoxy resins.

The glycidyl ester epoxy resins which can be employed in this invention are non-glycidyl ether epoxides containing more than one 1,2 epoxy group per molecule. They are characterized by substitution of the ester bond,

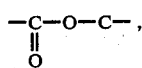

for the ether bond, —O—, and have the chemical structural formula:

where R is an organic radical substituent selected from the group consisting of R', R'—O—R', R'—COO—R' and mixtures thereof, where R' is selected from the group consisting of alkylene groups, having from about 1 to 8 carbon atoms, saturated cycloalkylene groups where the ring has 4 to 7 carbons and mixtures thereof, where $n$ is from about 1 to 8.

The hydantoin epoxy resins which can be employed in this invention are based on hydantoin, a nitrogen-containing heterocyclic ring having the structure:

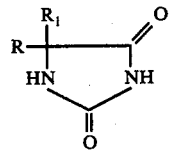

A wide variety of compounds can be formed by reacting the nitrogen positions in the five membered hydantoin ring. The hydantoin ring is readily synthesized from ketones, hydrogen, cyanide, ammonia, carbon dioxide and water. The epoxy resins are formed through reaction of the hydantoin with epichlorohydrin. Hydantoin rings can be linked together for form extended resins analogous in structure to bisphenol A. Polyfunctional resins can also be formed from these chain-extended materials by glycidylization of the hydroxyls and the remaining nitrogens. These heterocyclic glycidyl amine epoxy resins can be represented by the structural formula:

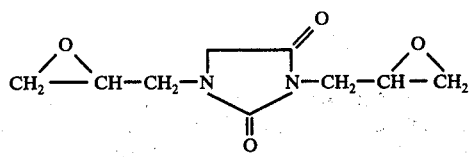

The cycloaliphatic type epoxides employed as the resin ingredient in the invention are selected from non-glycidyl ether epoxides containing more than one 1,2 epoxy group per molecule. These are generally prepared by epoxidizing unsaturated aromatic hydrocarbon compounds, such as cyclo-olefins, using hydrogen peroxide or peracids such as peracetic acid and perbenzoic acid. The organic peracids are generally prepared by reacting hydrogen peroxide with either carboxylic acids, acid chlorides, or ketones, to give the compound R-COOOH. These resins are well known in the art and reference may be made to Brydson, J., *Plastic Materials,* 1966, 471, for their synthesis and description.

Such non-glycidyl ether cycloaliphatic epoxides are here characterized by the absence of the ether oxygen bond, i.e. —O—, near the epoxide group, and are selected from those which contain a ring structure as well as more than one epoxide group in the molecule. The epoxide group may be part of the ring structure or may be attached to the ring structure. These epoxides may also contain ester linkages. These ester linkages are generally not near the epoxide group and are relatively unreactive, therefore these type materials are properly characterized as cycloaliphatic epoxides. The term "epoxide" as herein used is equivalent to the term "epoxy resin".

Examples of non-glycidyl ether cycloaliphatic epoxides would include 3,4-epoxycyclohexylmethyl-3,4-epoxycyclohexane carboxylate (containing two epoxide groups which are part of ring structures, and an ester linkage); vinyl cyclohexene dioxide (containing two epoxide groups, one of which is part of a ring structure); 3,4-epoxy - 6 - methylcyclohexyl methyl - 3,4-epoxy - 6 - methylcyclohexane carboxylate and dicyclopentadiene, having the following respective structures:

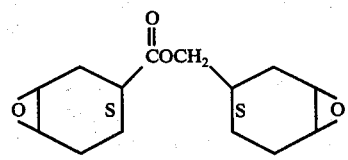

-continued

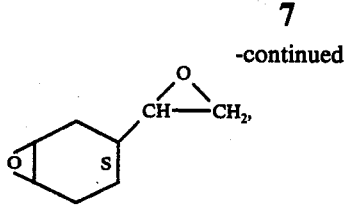

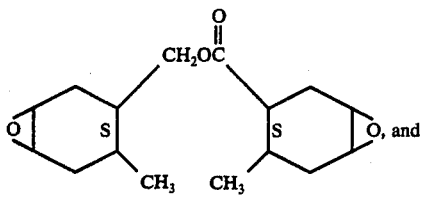

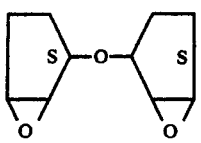

Other useful cycloaliphatic epoxides include 2-(3,4-epoxycyclohexyl-5,5-spiro-3,4-epoxy) cyclohexanemetadioxane and 3,4-epoxy-6-methylcyclohexyl-methyl adipate.

A distinguishing feature of many of the non-glycidyl ether cycloaliphatic epoxides is the location of the epoxy group(s) on a ring structure rather than on an aliphatic side chain. Generally, the cycloaliphatic epoxide particularly useful in this invention will have the formula selected from the group consisting of:

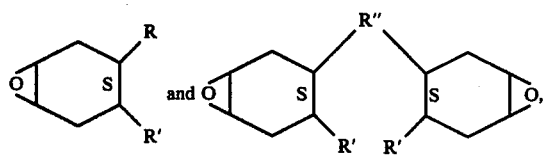

where S stands for a saturated ring structure, R is selected from the group consisting of $CHOCH_2$, $O(CH_2)_nCHOCH_2$ and $OC(CH_3)_2CHOCH_2$ radicals where $n = 1$ to 5, R' is selected from the group consisting of hydrogen, methyl, ethyl, propyl, butyl and benzyl radicals and R" is selected from the group consisting of $CH_2OOC$, and $CH_2OOC(CH_2)_4COO$ radicals.

All of these epoxide resins can be characterized by reference to their epoxy equivalent weight (E.EQ.WT.), which is defined as the mean molecular weight of the particular resin divided by the mean number of epoxy radicals per molecule. In the present invention, the suitable solid bisphenol A and bisphenol F epoxides will have a preferred epoxy equivalent weight of from about 340 to 1,500; the suitable liquid bisphenol A and bisphenol F epoxides will have a preferred epoxy equivalent weight of from about 150 to 250; the suitable epoxy-novolac resins are solids and will have a preferred epoxy equivalent weight of from about 100 to 500; the suitable solid multi-functional epoxy resins will have a preferred epoxy equivalent weight of from about 185 to 350; the suitable semi-solid multi-functional epoxy resins will have a preferred epoxy equivalent weight of from about 100 to 185; the suitable hydantoin resins are semi-solid and will have a preferred epoxy equivalent weight of from about 150 to 200; the suitable solid cycloaliphatic epoxides will have a preferred epoxy equivalent weight of from about 350 to 1,000; the suitable liquid cycloaliphatic epoxides will have a preferred epoxy equivalent weight of from about 50 to 400; the suitable solid glycidyl ester epoxies will have a preferred epoxy equivalent weight of from about 250 to 1,000; and the suitable liquid glycidyl ester epoxies will have a preferred epoxy equivalent weight of from about 150 to 350.

The epoxide system can be all semi-solid materials, but preferably is a mixture of liquid epoxide with either solid or semi-solid epoxide. An all solid epoxide will not provide a flexible mica pre-preg insulating tape, and an all liquid epoxide will not provide a non-tacky insulating tape. When a solid is used with a liquid, the preferred weight ratio of solid epoxide liquid eposide is from about 1.5:1 to 8.0:1. When a semi-solid is used with a liquid, the preferred weight ratio of semi-solid epoxide: liquid epoxide is from about 0.2:1 to 20:1. Semi-solid resins are characterized by low temperature softening points, usually below 60° C, and relatively low viscosities at slightly elevated temperatures, i.e., about 25,000 cps. to about 75,000 cps. at 125° F.

The epoxide resin must be mixed with a ketone or aromatic hydrocarbon solvent for the epoxide resin, and preferably a dual solvent system consisting of a mixture of a ketone, plus an aromatic hydrocarbon co-solvent selected from the group of benzene and arene and their mixtures. The ketone will have from 3 to 6 total carbon atoms in the molecule. Particularly useful ketones are acetone, methyl ethyl ketone and methyl isobutyl ketone. The arene is selected from the group of toluene, ethylbenzene, xylene and their mixtures.

Ketones or arenes having higher molecular weights than those described above will present problems of solvent flash off without catalyzing the resin system, i.e., solvent removal would require temperatures of about 175° C, which would activate the catalyst and being resin polymerization. The preferred weight ratio of ketone-benzene and/or arene is from about 70:30 to 30:70. This range provides the best solubility for all components, optimum volatility characteristics for solvent flash off, good wetting and resin saturation of the mica in the insulating tape.

The solvent content of the impregnant solution of polymerizable resin must be within a weight ratio of total epoxides: total solvent of from about 85:15 to 30:70 i.e., solvent content between about 15 to 70% by weight of the epoxide-solvent mixture based on total solvent plus total weight of epoxide. Above 70% solvent, not enough epoxide will be impregnated into the mica, causing void formation. Under 15% solvent, the composition will be too viscous and will result in poor impregnant penetration, uneven resin distribution through the mica and poor mica organo-tin contact. The viscosity of the impregnant solution of polymerizable resin must be between about 25 to 200 cps., but preferably between about 40 to 100 cps. at 25° C. By operating within this range, complete resin saturation of the tape is assured i.e., about 20 to 40 weight percent of the tape will be epoxide, based on the weight of epoxide, backing and mica.

The useful latent catalyst for this particular resin system are covalently bonded organo-tin compounds having the general chemical structural formulas:

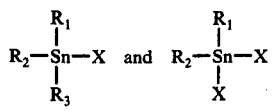

where $R_1$, $R_2$ and $R_3$ are organic radical substituents, each selected from the group consisting of alkyl groups, having from about 1–10 carbon atoms; aryl groups, such as phenyl i.e.

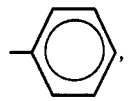

naphthyl i.e.

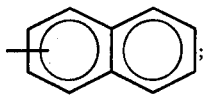

Cl, Br or $NO_2$ substituted aryl groups such as

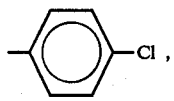

where the substituents selected from Cl, Br and $NO_2$ are substituted for hydrogens on the cyclic structure; aralkyl groups, such as

with the alkyl constituent having from about 1–10 carbon atoms; alkaryl groups, such as benzyl groups, i.e.

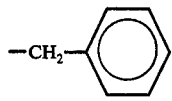

with the alkyl constituent having from about 1–10 carbon atoms; Cl, Br or $NO_2$ substituted alkaryl groups such as

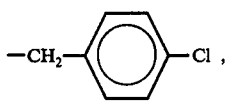

where the substituents selected from Cl, Br and $NO_2$ are substituted for hydrogens on the cyclic structure, with the alkyl constituent having from about 1–10 carbon atoms; cycloalkyl (alkylene) groups selected from cyclopentane groups, cyclopentene groups, cyclopentadiene groups, cyclohexane groups, cyclohexene groups, and cyclohexadiene groups; and heterocyclic groups selected from the pyrrolidine groups

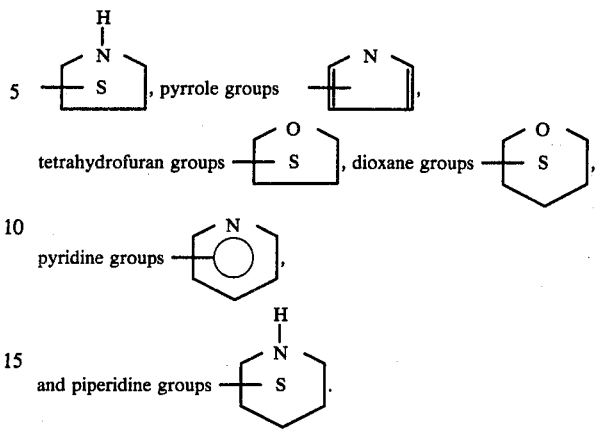

Over 10 carbons in an alkyl group leads to insolubility in the epoxy resin. Preferably, the R constituents will be selected from the group consisting of alkyl groups, benzyl groups and phenyl groups.

The X substituent is selected from the group consisting of halide, preferably Cl, hydroxide, acetate, butyrate, propionate, and dimethylphosphate. Examples of some suitable preferred compounds would include, for example:

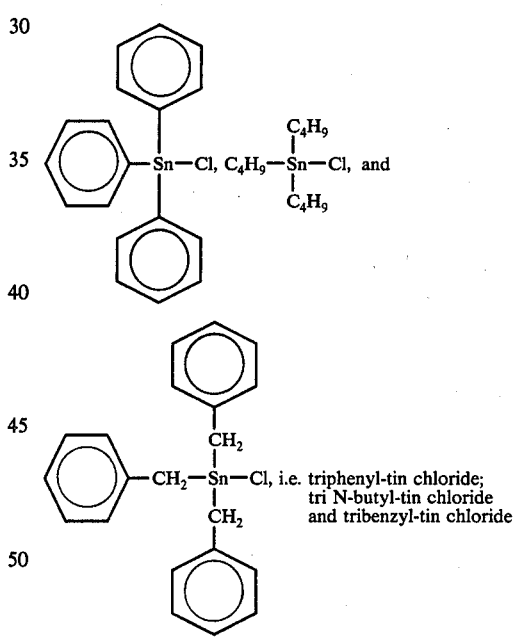

i.e. triphenyl-tin chloride; tri N-butyl-tin chloride and tribenzyl-tin chloride Others would include, for example, trimethyl-tin chloride; triethyl-tin chloride; tripropyl-tin chloride, triphenyl-tin bromide, triphenyl-tin iodide; triphenyl-tin acetate; triphenyl-tin hydroxide; triphenyl-tin butyrate; triphenyl-tin propionate; triphenyl-tin dimethyl phosphate; tribenzyl-tin bromide; tribenzyl-tin iodide; tribenzyl-tin acetate; tribenzyl-tin hydroxide; tribenzyl-tin butyrate; tribenzyl-tin propionate; tribenzyl-tin dimethyl phosphate; trinaphthyl-tin chloride; trichlorophenyl-tin chloride, tricyclopentene-tin chloride; dibenzylphenyl-tin chloride; diphenylbenzyl-tin chloride; diphenyl-n-butyl-tin chloride and the like, with triphenyl and tribenzyl-tin chloride being the most preferred.

These particular organo-tin compounds were found to be compatible with mica to provide very safe, non-exothermic latent catalysts. They allow the epoxide impregnated mica tape system to remain flexible during solvent removal and to be stored without appreciable stiffening for 6 to 12 months at 25° C. The covalent bonding of these compounds assures that no ionic fragments are present in the cured resin to deleteriously affect electrical properties. A complete description of the preparation of these compounds is given by Ingham R. K., Rosenberg S. D., and Gilman H., in "Organo-Tin Compounds" *CHEM. REVIEWS*, Vol. 60, 1960, pp. 459–525, herein incorporated by reference.

The catalyst of this invention, when it contacts the mica, acts as a latent catalyst i.e., one which will not start to polymerize the resin at temperatures of up to 120° C, but will cure it quickly at elevated "kick off" temperatures, of 120° C and above even when used in small quantities. A latent catalyst effect is required because the impregnated mica tape must be subjected to an evaporative solvent removal step, for a short period of time at tape and resin-solvent-catalyst temperatures of between about 65° to 115° C, without substantial epoxide resin cure. If the mica tape becomes stiff even to a minor degree, it will not be useful as an insulating winding tape material for motor and generator coils. If a sufficient amount of the dispersed organo-tin does not saturate between the mica particles and layers, a latent catalyst effect will not be initiated and the epoxide will start to gel at temperatures over about 25° C.

It is essential that no anhydride, boron trifluoride, amine, phenol or amide curing agent be used in this system, otherwise the composition will start to cure during solvent flash off, causing stiffness and shortening the storage life of the insulation. Use of the organo-tin compounds described above allows complete substitution for the usual amine or polycarboxylic acid anhydride curing agent, with a substantial cost reduction, and improved electrical and storage properties. The use of the organo-tin compounds allows elimination of stabilizing, reactive, low viscosity epoxide diluents, such as neopentyl diglycidyl ether, which seem to cause excessive tackiness in pre-impregnated tapes.

The organo-tin compounds, after impregnation and contact with the mica, do not initiate gellation of the epoxide resin during the period of solvent flash off, which should last no longer than 12 minutes at tape and resin temperature no higher than 115° to 120° C, corresponding to maximum oven temperatures of 130° C. The formation of a highly stable organo-tin-mica complex allows longer flash off periods at relatively high temperatures, without any substantial epoxide reaction, thus assuring complete solvent removal and absence of voids in the insulated tape which might harm electrical properties. After complete solvent flash off, the epoxide is in a substantially unreacted and uncured, fusible, solid condition, i.e., dry to the touch, non-tacky, containing up to about 3 wt.% solvent, i.e. about 97 to 99 wt.% solids, no more than about 3 to 10% reacted, and capable of fusion upon heating, to a fully cured infusible thermoset state.

It is believed that a large portion of the organo-tin compounds uniformly distributed through and substantially unreacted with the epoxide misture, form an effectively stable and latent complex with contacting mica which curbs the epoxide polymerization until resin temperatures of over 120° C are reached. At resin temperatures above 120° C, preferably 140° to 160° C, the breakdown or disassociation of these complexes give rise to highly reactive species which are extremely potent and able to very quickly promote polymerization of the epoxy groups. Long cure times over 120° C would result in significant resin drainage, high void contents and high power factor values. The epoxide latent catalyst combinations of this invention provide outstanding resin flow and fast cure times to give superior porperties for high voltage insulation application.

While applicant does not wish to be held to any particular theory, applicant believes that a substantial portion of the organo-tin compounds, up to about 90 weight percent of that present in the admixture, depending on mica type and particle size, complexes with contacting mica before or during the solvent flash evaporation step. It is thought that about one-half of the organo-tin compounds that will form a latent catalyst with the mica will do so upon impregnation, while the rest will complex during solvent removal, as the concentration and intimate contact of the organo-tin compounds increases.

Chemically, natural mica is a complex silicate of aluminum with potassium, magnesium, iron, sodium, lithium and traces of other elements. The mica most frequently used in insulation are the Muscovite $KAl_2(AlSi_3O_{10})(OH)_2$ and Phlogopite $KMg_3AlSi_3O_{10}(OH)_2$ types. It seems possible that the organo-tin compounds which are near or drawn to the alkali aluminum silicate will form complexes or adducts at the basic sites of the mica structure. With Muscovite, the most commonly used mica dielectric, these basic sites are most likely to be found at the

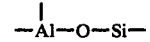

covalent linkage. Thus, bonding between an organo-tin, such as tribenzyltin-chloride and Muscovite mica could take place as shown:

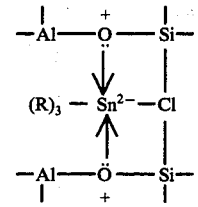

Here the electron donating atom is oxygen. These structures are not established or fully understood and are not to be taken as limiting, but are set out as a possible explanation of the observed facts. These adducts would be formed at resin temperatures up to 120° C and dissociated by heating over about 125° C. Without the mica present to chemically interact and form latent catalyst complexes with the organo-tin compounds, the epoxide resin would react with the organo-tin compound and would not provide a flexible tape. Also, other materials than mica, for example cellulose paper, linen, polyester, cotton, nylon and polyethylene do not appear to form these complexes with organo-tin compounds.

The amount of organo-tin compound used must be soluble in the epoxide-solvent system, yet be effective to cure the impregnated mica sheet during the final cure-heating step after solvent flash off without degradation of the epoxide resin. The effective amount of organo-tin compound used in this invention will be from 0.01 to 5.0 parts and preferably from about 0.05 to about 1.0 part per 100 parts epoxide resin.

Use of more than the above specified broad range amounts of organo-tin compound will provide too much catalyst in the mixture and will cause loss of flexibility and poor shelf-life in the uncured impregnated mica insulation. Use of over 5 parts of organo-tin per 100 parts epoxide could also cause a degradative oxidation effect on the epoxide in the cured mica insulation, causing significant weight loss over about 125° C, leading to void formation and catastrophic breakdown of insulating properties. Use of less than the above specified broad range amounts of organo-tin compound will not provide enough catalyst to effectively polymerize the epoxide during final cure, causing poor gell times and sluggish curing of the epoxide resin in the mica insulation.

In the method of this invention: (1) the epoxide is mixed with the solvent and then, (2) from the 0.01 to 5 parts per 100 parts epoxide resin of the organo-tin compound is added, slowly with stirring to the epoxide solution at temperatures of up to about 35° C. to form a homogeneous admixture, (3) the epoxide solution admixture is applied to a flexible insulation substrate, which will contain mica sheet in the form of paper, integrated flake paper, flakes, or large splittings, by any suitable means such as by brushing, dipping, spraying, etc., (4) the mica sheet insulation containing the contacting applied solution is generally heated at a temperature and for a time, generally about 1 to 12 minutes at a mica sheet and resin temperature of between 65° to 120° C i.e. an oven temperature of between about 85° to 135° C, effective to drive off or flash off substantially all of the solvent. Solvent could also be removed by suitable forced air drying or vacuum techniques. At least about 95 weight percent and preferably, about 97 weight percent of the solvent present in the solution will be removed to form substantially unreacted epoxide of about 97 to 99 percent solids, so that there is minimal solvent remaining upon final curing of the insulation.

A sufficient amount of mica-organo-tin chemical interaction by complexing is believed to take place in step (3) and (4), allowing solvent flash off without any substantial expoide-organo-tin reaction, at tape temperatures of up to 120° C. In step (4), while the oven temperature may be about 135° C, the mica tape and resin-solvent-catalyst temperatures are below 120° C because of the cooling effect of solvent evaporation, and because the mica insulation is only in the oven for a short period of time.

Finally, the winding tape insulation is cooled to room temperature, at which time it is flexible, tack-free and can be wound onto a takeup reel without blocking or sticking, and stored for up to 1 year without losing flexibility and tack-free properties. It can then be tightly wrapped, either by hand or using commercial coil wrapping machines, onto coils and other metallic electrical conductors as a curable pre-preg which does not require vacuum resin impregnation. After flash off, the epoxide is a fusible, dry, non-cured solid, containing preferably, only about 3 weight percent solvent residue, based on epoxide, mica, solvent, catalyst weight. The epoxide in the mica sheet is capable of being finally, fully cured, generally at a resin temperature of at least 120° C, preferably 140° to 160° C, for 2 to 24 hours, to remove the solvent residue and to advance the resin to form an infusible thermoset state, by complete catalytic polymerization with the organo-tin latent catalyst. During cure the mica and resin temperatures shortly reach oven or press temperatures.

One type of a closed full coil 10 which may be prepared in accordance with the present invention is illustrated in FIG. 1. The full coil comprises an end portion comprising a tangent 11, a connecting loop 12, and another tangent 13 with bare leads 14 extending therefrom. Straight slot portions 15 and 16 of the coil, which have been hot pressed to cure the resin and to form them to predetermind shape and size, are connected to the tangents 11 and 13 respectively. These slot portions are connected to other tangents 17 and 18 connected through another loop 19.

The complete full coils prepared as disclosed herein, are placed within the slots of the stator or rotor of an electrical machine and the end windings are wrapped and tied together. The uninsulated leads are then soldered, welded or otherwise connected to each other or to the commutator. Thereafter, the entire machine will be placed in an oven and heated to a temperature effective to cure the completely reactive composition in the mica tape insulating the coil.

Figure 2:
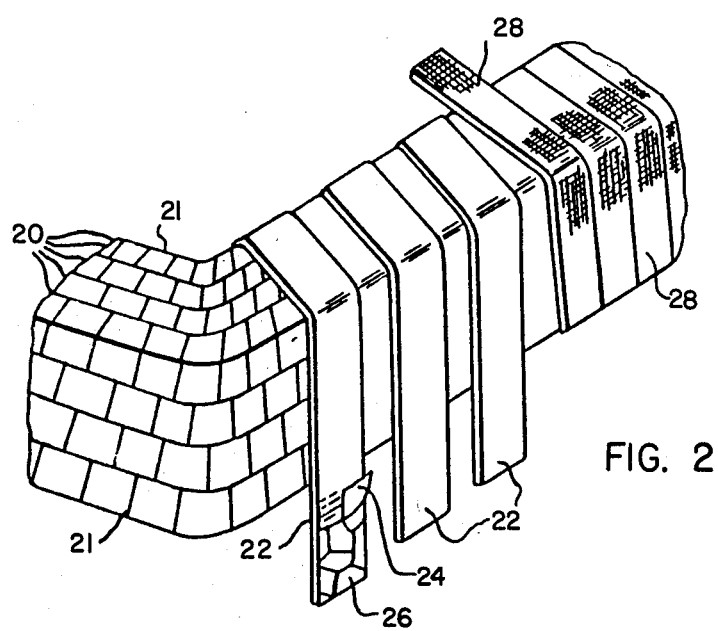
FIG. 2 is a fragmentary view in perspective, showing part of a copper coil being wound with the flexible impregnated mica type of this invention.

Referring to FIG. 2 of the drawings, there is illustrated a coil suitable for use in high-voltage electric motors and generators. The full coil would be disposed within the slots of the metal stator surrounding the metal motor aramature or generator rotor and could also be used in the armature and rotor slots. The coil comprises a plurality of turns of conductors 20. Each turn of the conductor 20 consists essentially of a copper bar or wire wrapped with turn insulation 21. The turn insulation 21, preferably is prepared from a fibrous sheet or strip impregnated with a bonding resin. Glass fiber cloth, paper, asbestos cloth or asbestos paper treated with a resin may be used with equally satisfactory results. The resin applied to the turn insulations to bond them together may be a phenolic resin, an alkyd resin, a melamine resin or the like, or mixtures of any two or more of these.

The turn insulation is not adequate to withstand the severe voltage gradients that will be present between the conductor and ground when the coil is installed in a high-voltage electrical machine. Therefore, ground insulation for the coil is provided by wrapping plural layers of composite mica tape 22 about the turn 20. Such composite tape 22 can comprise a pliable backing sheet 24 of, for example, poly-ethylene glycol terephthalate mat, having a layer of mica flakes 26 bonded thereto. The tape may be applied half lapped, abutted or otherwise. Generally, a plurality of layers of the composite tape 22 are wrapped about the coil with 16 or more layers generally being used for high voltage coils. To impart better abrasion resistance and to secure a tighter insulation, a wrapping of an outer tape 28 of a tough fibrous material, for example, glass fiber, asbestos or the like is applied to the coil.

The pre-impregnated mica tape 22 for insulating the coils shown in FIGS. 1 and 2, may be prepared from a sheet backing support material upon which is disposed a layer of mica in the form of integrated flake paper, flakes, splitting or very fine particle size mica paper. The sheet backing and the mica are contacted and bonded together with liquid resinous impregnant. This mica insulation is preferably in the form of a tape of the order of ⅛ inch to 2 inches in width, though sheet insulation of any other width may be prepared.

For building electrical machines, such as motors and generators, the sheet backing for the mica may comprise cellulose paper, cotton or linen fabrics, asbestos paper, woven glass cloth or glass fibers, sheets or fabrics prepared from synthetic resins such as nylon, polyethylene and linear polyethylene terephthalate resins, or additional mica paper sheets. Sheet backing material of a thickness of approximately 1 mil (0.001 in. or 0.0025 cm.), to which there has been applied a layer of from 3 to 10 mils thickness of mica has been successfully employed.

Mica flakes are generally about 1/16 to ¾ inch square while mica splittings are generally about ¾ to 3 inches square. Integrated mica flake paper is of compacted mica particles about 1/32 to ⅛ inch square and fine mica paper is made of compacted mica particles about 1/64 to 1/16 inch square. Generally, the finer the mica particles the more interaction with the organo-tin catalyst.

The mica tape is impregnated with the liquid, completely reactive polymerizable resinous compositions of this invention so that there is complete saturation between mica layers. After impregnation the solvent is flashed off and the flexible pre-preg test is stored or wrapped around the coil or other conductor. The insulated coil, after wrapping, is then exposed to the application of heat and pressure to provide a thermally stable, tough, cured insulation in the thermoset state. No vacuum impregnation step is needed.

Coils insulated with the highly flexible, impregnated, mica wrapping of this invention are placed in a hot press in which the slot portions are subjected to heat and pressure for a period of time to cure the resinous composition in the slot portions. The end portions of the windings will be substantially uncured. This hot pressing operation produces a coil having a slot portion of the exact size required for the electrical machine and can be fitted into the slots of the electrical machine readily with flexing of the end portions. The mica wrapping must contain substantially unreacted resin so that there is considerable flow and consolidation of the resin during hot pressing otherwise void formation will result. For this reason a completely B staged resin system would provide a high void formation possibly causing premature breakdown of the insulation under high voltage conditions.

Figure 3:
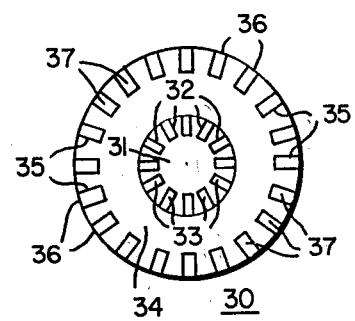
FIG. 3 is a cross-sectional view of a motor, containing coils wound with the impregnated mica type of this invention.
Figure 4:
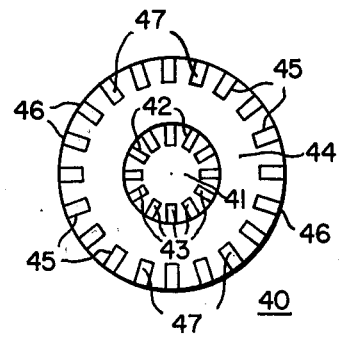
FIG. 4 is a cross-sectional view of a generator, containing coils wound with the impregnated mica tape of this invention.

By way of illustration, FIG. 3 shows one embodiment of a motor 30 in cross-section. The motor comprises a metal armature 31 having slots 32 therein, containing insulated coils 33, surrounded by a metal stator 34 having slots 35 therein about the stator circumference at 36. The stator slots contain insulated coils 37. All the insulation on the coils 33 and 37 can comprise the highly flexible pre-preg mica winding tape composites of this invention. FIG. 4 shows one embodiment of a generator 40 in cross-section. The generator comprises a metal rotor 41 having slots 42 therein, containing insulated coils 43, surrounded by a metal stator 44 having slots 45 therein about the stator circumference at 46. The stator slots contain insulated coils 47 and may also contain inner cooling channels not shown. All of the insulation on the coils 43 and 47 can comprise the high flexible, pre-preg mica winding tape composites of this invention.

The following non-limiting examples are illustrative of various resin formulations and pre-preg insulating tape composites of this invention.

EXAMPLE 1

A series of resin formulations were made containing various epoxy resins and epoxy resin mixtures and a variety of solvents and solvent systems, with triphenyl tin chloride (TPTCl), as shown in Table 1 below:

TABLE 1

| Sample | Parts Resin* | Parts Solvent | Parts Catalyst |
|---|---|---|---|
| 1 | 100p GLY-CEL C-245 | 50p Methylethylketone<br>50p Toluene | 1p TPTCl |
| 2 | 75p GLY-CEL C-295<br>25p GLY-CEL C-200 | 50p Methylethylketone<br>50p Toluene | 0.5p TPTCl |
| 3 | 75p ERRA-4211<br>25p ERL-4221 | 50p Methylethylketone<br>50p Toluene | 0.5p TPTCl |
| 4 | 85p XD-7855<br>15p XD-7818 | 100p Toluene | 0.5p TPTCl |
| 5 | 80p XD-7855<br>20p XD-7818 | 100p Toluene | 0.5p TPTCl |
| 6 | 70p SU-8<br>30p XD-7818 | 100p Toluene | 0.5p TPTCl |
| 7 | 100p XD-7342-01<br>50p XD-7818 | 150p Toluene | 0.75p TPTCl |
| 8 | 100p XD-7342 | 100p Toluene | 0.5p TPTCl |

| Resin* | Resin Type | E.EQ.WT | State at 25° C |
|---|---|---|---|
| GLY-CEL C-200 | Glycidyl Ester Epoxy | 152 | Liquid |
| GLY-CEL C-245 | Glycidyl Ester Epoxy | 275 | Semi-Solid |
| GLY-CEL C-295 | Glycidyl Ester Epoxy | 440 | Solid |
| ERRA-4211 | Cycloaliphatic Epoxy | 370 to 425 | Solid |
| ERL-4221 | Cycloaliphatic Epoxy | 133 | Liquid |
| XD-7855 | Epoxy Novolac | 200 | Solid |
| XD-7818 | Bisphenol 'F' Epoxy | 165 | Liquid |
| SU-8 | Multi-Funct. Epoxy | 225 | Solid |
| XD-7342-01 | Multi-Funct. Epoxy | 215 | Solid |
| XD-7342 | Multi-Funct. Epoxy | 162 | Semi-Solid |

Samples 1 and 8 were single component semi-solid epoxy resins, and the rest of the above samples were two component solid-liquid epoxy resins. The solvent content of the samples was 50% based on the weight of total epoxy resin. The weight ratio of solid epoxide:liquid epoxide was 2:1 for Sample 7; 2.3:1 for Sample 6; 3:1 for Samples 2 and 3; 4:1 for Sample 5; and 5.6:1 for Sample 4. Several all solid resin formulations were also made for comparative purposes, as shown in Table 2 below:

TABLE 2

| Sample | Parts Resin | Parts Solvent | Parts Catalyst |
|---|---|---|---|
| 20 | 100p GLY-CEL C-295 | 50p Methylethylketone<br>50p Toluene | 1p TPTCl |
| 21 | 100p ERRA-4211 | 100p Toluene | 0.5p TPTCl |
| 22 | 100p ERRA-4211 | 50p Methylethylketone<br>50p Toluene | 0.5p TPTCl |
| 23 | 100p SU-8 | 100p Toluene | 0.5p TPTCl |

The resins above were mixed with solvent and then the catalyst was slowly added with stirring at about 25° C. All components were dissolved and the composition was homogeneous. It is important to add the organo-tin compound to the epoxide-solvent system, otherwise the organo-tin will separate, and the impregnating composition will not be homogeneous. The viscosities of the impregnating compositions were about 50 to 60 cps. at 25° C.

Using 108 type-glass woven fabric as backing material; 4 × 4-inch glass strips were bonded to integrated flake mica paper by brushing the above-described resinous, homogeneous impregnating compositions onto the mica, through the glass fabric. The composition appeared to easily wet the mica and uniformly distribute between the mica particles and layers, impregnating without formation of any voids. The mica was in the form of integrated mica flake paper about 0.005 inch thick and composed of compacted flakes between about 1/16 inch to ¼ inch square.

The solvents were then substantially removed i.e., about 98% of their initial amount, by placing the impregnated mica strips in a forced air oven for 6 minutes at an oven temperature of 150° C. The actual temperature of the mica sheet strips and resin would be close to 100° C, since the solvent evaporation cools the strips. The epoxide-organo-tin-mica-glass samples contained about 25 to 32 wt.% catalyzed epoxide resin plus solvent residue as determined by initial weight and final weight measurement after flash off.

After solvent flash off, the pre-preg strips were found to be blister-free. They were tested for flexibility, i.e., the strips were wound around a ½-inch mandrel, to see if they would crease or crack. They were also tested for tackiness, i.e. the strips were placed on each other to see if they would stick or block.

The epoxide and latent catalyst were in a substantially unreacted state, i.e., no more than about 10% reacted or crosslinked. The organo-tin compounds apparently interacted with the mica to provide a latent catalyst effect, so that the epoxide did not start to cure. Other samples of the composition not impregnated into mica sheet, when put in an oven completely cured at an oven temperature of about 150° C.

Composites were then made with most of these mica strips for power factor (100 tan δ) and dielectric constant (ε') measurements (ASTM designation D150-65T). This was done by stacking four pieces of impregnated mica strip on top of each other and curing them to a thermoset state between metal plates in a press for 16 hours at 150° C and 0.50 lb./sq.in. to form a composite. Here, the temperature of the strips and resin would be 150° C after about 15 minutes. Sample 7 was cured an additional 4 hours at 175° C. The resulting laminated composite thickness was about 0.026 to 0.028 inch. The results of these tests are shown in Table 3 below:

about 10% if they were further cured for 10 to 12 hours at about 175° C.

Breakdown Voltages and Dielectric Strength was also measured on sample composites 5 and 6 under hydrocarbon oil at 25° C, using 1 in. diameter round electrodes (radius on edge ⅛ in.), using a voltage rise of 1kV/sec. For sample composite 5 (26.4 mil) the Breakdown Voltage was 14kV(rms) and the Dielectric Strength was 530 Volts/mil(rms); for sample composite 6 (27.0 mil) the Breakdown Voltage was 15kV(rms) and the Dielectric Strength was 556 Volts/mil(rms). Dielectric Strength values above 200 Volts/mil(rms) are considered excellent for 25 to 30 mil integrated mica flake-cured resin composites for high voltage insulation applications, such as use on coils in the stators, rotors and armatures of high voltage electrical apparatus. Resin impregnated mica tape using the above-described resin-solvent-catalyst systems would provide excellent insulation for electrical conductors, stator coils, rotor coils and armature coils. Portions of the impregnated glass-fabric-mica tapes were stored at 25° C for 6 months without losing any noticeable flexibility and would be useful after that time period for coil winding. Tensile strength of the tapes was also found to be adequate for automatic commercial coil wrapping machines.

EXAMPLE 2

A series of resin formulations were made containing various epoxy resin mixtures, a variety of solvents and solvent systems, with tribenzyl tin chloride (TBTCl), and tri-n-butyl tin acetate (TnBTA) as substitutes for triphenyl tin chloride, as shown in Table 4 below:

TABLE 4

| Sample | Parts Resin | Parts Solvent | Parts Catalyst |
|---|---|---|---|
| 40 | 80p XD-7855 20p XD-7818 | 100p Toluene | 0.25p TBTCl |
| 41 | 75p ERRA-4211 25p ERL-4221 | 50p Methylethylketone 50p Toluene | 1.0p TnBTA |

The resins above were mixed with solvent and then the catalyst was slowly added with stirring at about 25° C. All components were dissolved and the composition was homogeneous. The viscosities of the impregnating

TABLE 3

| Sample Composite | Mica Product Appearance | Electrical Properties 150° C & 60Hz | |
|---|---|---|---|
| | | 100 × tan δ | ε' |
| 1 | Tack-free and flexible | 3.5% | 3.3 |
| 2 | Tack-free and flexible | 3.2% | 3.0 |
| 3 | Tack-free and flexible | 4.1% | 3.2 |
| 5 | Tack-free and flexible | 5.3% | 3.2 |
| 6 | Tack-free and flexible | 18.6%* | 3.5* |
| 7 | Tack-free and flexible | 29.0% | 5.8 |
| 8 | Tack-free and flexible | 12.0% | 3.6 |
| 4 | Tack-free but slightly stiff | | not tested |
| 20 | Tack-free but somewhat stiff | 2.7% | 2.9 |
| 21 | Tack-free but bubbly and very stiff | | not tested |
| 22 | Tack-free but somewhat stiff | 2.3% | 3.1 |
| 23 | Tack-free but very stiff | 2.1% | 3.2 |

*Electrical Properties measured at 160° C.

As can be seen, samples 20 to 23 containing all solid resin formulations, and Sample 4 containing a weight ratio of solid epoxide:liquid epoxide of 5.6:1, were inflexible to varying degrees. Power factor values below 15% at 150° C are considered very good for 25 to 30 mil integrated mica flake-cured resin composites for high voltage insulation applications. Samples 6, 7 and 8 used extremely high temperature resistant multi-functional epoxy resins (class H, i.e. 175° to 225° C applications) and would provide power factor values at 150° C of compositions were about 50 to 60 cps. at 25° C. These compositions were impregnated into integrated mica flake paper as in EXAMPLE 1 using the same materials and methods. The impregnated mica strips were then heated to flash off solvent as in EXAMPLE 1 to form blister free pre-preg strips. The sample composites 40 and 41 were cured at 150° C for 16 hours. The pre-preg strips were then tested for flexibility and electrical properties, as in EXAMPLE 1. The results of these tests are shown in Table 5 below:

TABLE 5

| Sample Composite | Mica Product Appearance | Electrical Properties 150° C & 60Hz | |
|---|---|---|---|
| | | 100 × tan δ | ε' |
| 40 | Tack-free and flexible | 4.1% | 3.2 |
| 41 | Tack-free and flexible | 5.6% | 4.1 |

As can be seen, other selected organo-tin compounds can be substituted for triphenyl tin chloride with outstanding results. The same would be true with the other enumerated organo-tin compounds described as useful hereinabove.

EXAMPLE 3

As a comparative example, to show that not all catalysts are effective to provide good electrical properties, or to provide a tack-free solid state without addition of acid anhydrides, several formulations were tested as shown in Table 6 below:

TABLE 6

| Parts Resin* | Parts Solvent | Parts Catalyst | Post Heat Cycle Appearance | Electrical Properties 125° C | |
|---|---|---|---|---|---|
| | | | | 100 × tan δ | ε' |
| 80p EPIREZ 5162 20p DER 332 | 50p Methyl Ethylketone 50p Toluene | 1p tetrabutyl phosphonium acetate | wouldn't gell: 16 hr. at 150° C | could not measure | |
| 80p EPIREZ 5162 20p DER 332 | none | 2p boron trifluoride: monoethyl amine | solid: 24 hr. at 150° C 4 hr. at 160° C | 52.1% | 5.03 |

| Resin* | Resin Type | E.EQ.WT. | State at 25° C |
|---|---|---|---|
| EPIREZ 5162 | Bisphenol 'A' Epoxy | 360 to 400 | solid |
| DER 332 | Bisphenol 'A' Epoxy | 172 to 176 | liquid |

The resins were mixed with solvent and/or catalyst slowly with stirring at about 25° C. All components were dissolved and the composition was homogeneous. Twenty gram samples were poured into aluminum dishes which were placed in an oven and heated as shown in the Table above. The sample with tetrabutyl phosphonium acetate would not cure and so no electrical properties could be taken. This composition, if used in a mica tape would remain as a semi-solid and a large volume would drain off during attempted curing, which might require extremely long times and high temperatures. The sample with boron trifluoride:monoethyl amine provided a slightly stiff solid after the solvent had flashed off and cured to a hard, solid, thermoset ⅛ inch sample. This formation, however, provided very high power factor values, even at low temperatures, i.e., 125° C and even after an extended cure cycle.

EXAMPLE 4

As a comparative example, to show that liquid epoxy resins are unsuitable alone for making flexible, tack-free mica pre-pregs, a formulation was made as follows: 100 parts of a resin substantially equivalent to a fully epoxidized ester product of octadiene alcohol and hexahydrophthalic anhydride, having an Epoxy Equivalent Weight of about 175 to 182 and a viscosity at 25° C of 2,700 cps. was dissolved in a blend of 50 parts of methylethylketone and 50 parts of toluene, to a solids content of 50 wt.%. One part of tirphenyl tin chloride was added and a mica pre-preg was prepared as described in EXAMPLE 1. After solvent removal for 12 minutes at 160° C, the pre-preg was found to be extremely tacky. Only after substantial reaction of the resin, by heating for 2 hours at 150° C, did the resin B-stage and become tack free. Then, however, the pre-preg was found to be rigid and inflexible and unsuitable for wrapping electrical coils.

I claim:
1. A method of making a highly flexible, mica insulation winding tape sheet material comprising the steps of:
 (a) mixing epoxide resin selected from the group consisting of semi-solid epoxide, a mixture of solid epoxide and liquid epoxide and a mixture of semi-solid epoxide and liquid epoxide, with solvent for the epoxide resin, where the weight ratio of total epoxide:total solvent is from about 85:15 to 30:70; and then
 (b) mixing the epoxide resin-solvent mixture, with from 0.01 to 5.0 parts per 100 parts epoxide resin of an organo-tin compound, having a structural formula selected from the group consisting of:

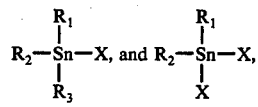

where $R_1$, $R_2$ and $R_3$ are organic groups and each X is selected from the group consisting of halide, hydroxide, acetate, butyrate, propionate, and dimethyl phosphate, to form a homogeneous admixture; and then
 (c) applying the homogeneous epoxide resin-solvent-organo-tin admixture to a flexible sheet material comprising mica, so that organo-tin compound contacts mica causing the organo-tin compound to act as a latent catalyst; and then
 (d) removing at least 95 weight percent of the solvent from the epoxide resin-solvent-organo-tin catalyst admixture in the sheet material without any substantial curing of the epoxide resin or reaction of the organo-tin compound, forming a flexible sheet with substantially unreacted epoxide resin and causing an increased amount of substantially unreacted organo-tin compound to contact mica in the sheet material; wherein the amount of organo-tin compound added is effective to advance the epoxide resin in the sheet material from the substantially unreacted state to a cured thermoset state upon heating over a resin-catalyst temperature of 120° C.

2. The method of claim 1 also including cooling the mica sheet after removing solvent, where in step (d), the solvent is removed by heating at a resin-solvent-catalyst temperature of up to 120° C, to form a resin saturated, mica insulation sheet that will remain tack-free at 25° C for over 6 months and which upon complete cure will provide an insulation with power factor values of below 15% at 150° C, the solvent being selected from the group consisting of ketones having from 3 to 6 total carbon atoms in the molecule, aromatic hydrocarbons and mixtures thereof, and where in steps (c) and (d), the organo-tin and mica interact to form a stable organo-tin-mica latent complex.

3. The method of claim 1 wherein the epoxide resin is selected from the group consisting of a mixture of solid epoxides and liquid epoxides, wherein the weight ratio of solid epoxide:liquid epoxide is from about 1.5:1 to 8.0:1, a mixture of semi-solid epoxides and liquid epoxides, wherein the weight ratio of semi-solid epoxide: liquid epoxide is from about 0.2:1 to 20:1, and semi-solid epoxides, the solvent is a mixture of ketone and aromatic hydrocarbon co-solvent selected from the group consisting of benzene and arene solvents and mixtures thereof, wherein the ratio of ketone:co-solvent is from about 70:30 to 30:70, and the arene is selected from the group consisting of toluene, ethylbenzene, xylene and mixtures thereof; and wherein, in step (b), mixing is carried out at temperatures of up to about 35° C, to form an admixture having a viscosity of between about 25 to 200 cps. at 25° C, and the solvent is removed in step (d) by heating at a resin-solvent catalyst temperature of between 65° to 120° C for about 1 to 10 minutes.

4. The method of claim 3, wherein about 0.05 to about 1.0 part of organo-tin is used per 100 parts of total epoxide.

5. The method of claim 3 wherein the organo-tin compound is selected from covalently bonded compounds having the structural formula selected from the group consisting of:

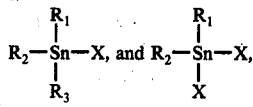

where $R_1$, $R_2$ and $R_3$ are selected from the group consisting of alkyl groups having from about 1 to 10 carbon atoms, aryl groups, Cl, Br or $NO_2$ substituted aryl groups, alkaryl groups with the alkyl constituent having from 1 to 10 carbon atoms, Cl,Br or $NO_2$ substituted alkaryl groups with the alkyl constituent having from about 1 to 10carbon atoms, aralkyl groups with the alkyl constituent having from about 1 to 10 carbon atoms, cyclopentane groups, cyclopentene groups, cyclopentadiene groups, cyclohexane groups, cyclohexane groups, cyclohexadiene groups, pyrrolidine groups, pyrrole groups, tetrahydrofuran groups, dioxane groups, pyridine groups and piperidine groups, and X is selected from the group consisting of halide, hydroxide, acetate, butyrate, propionate and dimethyl phosphate.

6. A method of making a void free, highly flexible mica insulation winding tape sheet material comprising the steps of:
(a) mixing solid epoxide resin, liquid epoxide resin, and solvent selected from the group consisting of ketones having from 3 to 6 carbon atoms in the molecule, benzene, toluene, ethylbenzene, xylene and mixtures thereof; wherein the weight ratio of solid epoxide:liquid epoxide is from about 1.5:1 to 8.0:1, and the weight ratio of total epoxide:total solvent is from about 85:15 to 30:70; and then
(b) mixing the epoxide resin-solvent mixture with from 0.01 to 5.0 parts per 100 parts epoxide resin of an organo-tin compound selected from the group consisting of triphenyl-tin chloride, tri-n-butyl-tin chloride, tribenzyl-tin chloride and mixtures thereof, at a temperature up to about 35° C, to form a homogeneous admixture having a viscosity of between about 25 to 200 cps. at 25° C; and then
(c) applying the homogeneous epoxide resin-solvent-organo-tin admixture to a flexible sheet material comprising mica, to that organo-tin compound contacts mica causing the organo-tin compound to act as a latent catalyst; and then
(d) removing at least 95 weight percent of the solvent from the epoxide resin-solvent-organo-tin catalyst admixture in the sheet material, at a resin-solvent-catalyst temperature of up to 120° C, without any substantial curing of the epoxide resin or reaction of the organo-tin compound, forming a flexible sheet with substantially unreacted epoxide resin and causing an increased amount of substantially unreacted organo-tin compound to contact mica in the sheet material; wherein the amount of organo-tin added is effective to advance the epoxide resin in the sheet material from the substantially unreacted state to a cured thermoset state upon heating at a resin-catalyst temperature of at least 120° C.

7. A highly flexible, void free, high voltage capability insulation winding tape material made by the method of claim 6.

8. The method of claim 6, where the solvent is removed to form a resin saturated, mica insulation sheet that will remain tack-free at 25° C for over 6 months and which upon complete cure will provide an insulation with power factors values of below 15% at 150° C, and where in steps (c) and (d) the organo-tin and mica interact to form a stable organo-tin-mica latent complex.

9. A highly flexible, void free, high voltage capability, resin saturated, insulation winding tape sheet material, comprising mica and a contacting, polymerizable, 95 to 99 weight percent solids resinous composition consisting of a homogeneous mixture of substantially unreacted epoxide resin selected from the group consisting of semi-solid epoxide, a mixture of solid epoxide and liquid epoxide and a mixture of semi-solid epoxide and liquid epoxide and from 0.01 to 5.0 parts per 100 parts epoxide resin of a substantially unreacted organo-tin compound effective to cure the epoxide at resin-catalyst temperatures of at least 120° C; wherein the organo-tin compound has the structural formula selected from the group consisting of:

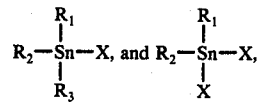

where $R_1$, $R_2$ and $R_3$ are organic groups and each X is selected from the group consisting of halide, hydroxide, acetate, butyrate, propionate and dimethyl phosphate, said organo-tin compound contacting an interacting with mica causing the organo-tin compound to act as a latent catalyst, said flexible winding tape being capable of remaining tack-free at 25° C for over 6 months and upon complete cure will provide an insulation with power factor values of below 15% at 150° C.

10. The sheet material of claim 8 wrapped around an electrical conductor selected from the group consisting of copper and aluminum and cured at a resin-catalyst temperature of at least 120° C.

11. The highly flexible winding tape material of claim 9 wherein the organo-tin compound is selected from compounds having the structural formula selected from the group consisting of:

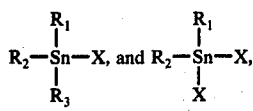

where $R_1$, $R_2$ and $R_3$ are selected from the group consisting of alkyl groups having from about 1 to 10 carbon atoms, benzyl groups and phenyl groups and X is selected from the group consisting of halide, hydroxide, acetate, butyrate, propionate and dimethyl phosphate.

12. The highly flexible winding tape material of claim 11 wherein the organo-tin compound is selected from compounds having the structural formula selected from the group consisting of:

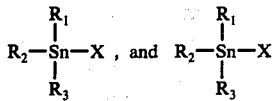

wherein $R_1$, $R_2$ and $R_3$ are selected from the group consisting of alkyl groups having from about 1 to 10 carbon atoms, aryl groups, Cl, Br or $NO_2$ substituted aryl groups, alkaryl groups with the alkyl constituent having from about 1 to 10 carbon atoms, Cl, Br or $NO_2$ substituted alkaryl groups with the alkyl constituent having from about 1 to 10 carbon atoms, aralkyl groups with the alkyl constituent having from about 1 to 10 carbon atoms, cyclopentane groups, cyclopentene groups, cyclopentadiene groups, cyclohexane groups, cyclohexane groups, cyclohexadiene groups, pyrrolidine groups, pyrrole groups, tetrahydrofuran groups, dioxane groups, pyridine groups and piperidine groups, and X is selected from the group consisting of halide, hydroxide, acetate, butyrate, propionate and dimethyl phosphate.

13. The highly flexible winding tape material of claim 8 wherein about 0.05 to about 1.0 part of organo-tin compound is used per 100 parts of total epoxide.

14. An insulated high voltage electrical apparatus comprising a metal stator having slots therein surrounding a metal rotor, conducting electrical coil windings disposed within the slots of the stator, and a body of cured resinous insulation applied to and completely impregnating the electrical coil windings, the insulation comprising the cured winding tape of claim 11.

15. The electrical apparatus of claim 14 being a generator; wherein the windings are wrapped with plural layers of mica tape, the rotor has slots therein containing conducting electrical coil windings having a body of cured resinous insulation applied to and completely impregnating the coil windings, the insulation comprising the cured winding tape of claim 11.

16. An insulated high voltage electrical apparatus comprising a metal stator having slots therein surrounding a metal armature, conducting electrical coil windings disposed within the slots of the stator, and a body of cured resinous insulation applied to and completely impregnating the electrical coil windings, the insulation comprising the cured winding tape of claim 9.

17. The electrical apparatus of claim 16 being a motor; wherein the coil windings are wrapped with plural layers of mica tape, the armature has slots therein containing conducting electrical coil windings having a body of cured resinous insulation applied to and completely impregnating the coil windings, the insulation comprising the cured winding tape of claim 11.

* * * * *